United States Patent [19]

Reinhardt

[11] Patent Number: 5,549,236
[45] Date of Patent: Aug. 27, 1996

[54] METHOD AND APPARATUS FOR POSITIVE, TORSION-PROOF HOLDING DURING FRICTION WELDING

[75] Inventor: Rudolf Reinhardt, Esslingen, Germany

[73] Assignee: Mercedes-Benz AG, Germany

[21] Appl. No.: 352,567

[22] Filed: Dec. 9, 1994

[30] Foreign Application Priority Data

Dec. 9, 1993 [DE] Germany ............. 43 44 1954.2

[51] Int. Cl.⁶ .................................................. B23K 20/12
[52] U.S. Cl. ................ 228/114.5; 228/212; 228/2.3
[58] Field of Search .................... 228/113, 114.5, 228/212, 2.3; 29/240; 156/73.5, 580; 264/68

[56] References Cited

U.S. PATENT DOCUMENTS

| | | | |
|---|---|---|---|
| 3,452,421 | 7/1969 | Cheng et al. | 228/114.5 |
| 3,965,554 | 6/1976 | Amos | 228/114.5 |
| 4,427,471 | 1/1984 | Chierici | 156/73.5 |
| 4,758,392 | 7/1988 | Collins et al. | 156/73.5 |
| 5,306,383 | 4/1994 | Kobiella | 156/73.5 |

FOREIGN PATENT DOCUMENTS

| | | |
|---|---|---|
| 83124209 | 9/1983 | Germany. |
| 3802300C1 | 8/1989 | Germany. |
| 3834080C2 | 9/1990 | Germany. |
| 1808581 | 4/1993 | U.S.S.R. ................. 228/2.1 |

*Primary Examiner*—Samuel M Heinrich
*Attorney, Agent, or Firm*—Evenson, McKeown, Edwards & Lenahan, P.L.L.C.

[57] ABSTRACT

A method for the friction welding of parts and a holding device for at least one of the parts during the friction welding are disclosed. For the torsion-proof holding of the part in the holding device, regular positive-connection faces are provided therein. Corresponding positive-connection faces are fashioned in the region of the holding face of the part, such that the part can be retained in the holding device in a positive, torsion-proof manner. So as avoid forming the positive-connection faces located on the parts in a separate operation, these faces are produced only during the execution of the friction welding by utilizing the axial pressing force via an embossing operation carried out by the positive-connection counterfaces formed in the holding device and made cutter-like. For this purpose, the positive-connection faces are arranged in close succession in the form of a ring at an acute angle of less than 45° to the axial force direction, so that they can dig in a force transmitting manner into a peripheral workpiece edge located on the parts.

5 Claims, 4 Drawing Sheets

METHOD AND APPARATUS FOR POSITIVE, TORSION-PROOF HOLDING DURING FRICTION WELDING

BACKGROUND AND SUMMARY OF THE INVENTION

The present invention is directed to a method for friction welding of a first part having a smooth-faced functional outside portion to a second part, comprising the steps of retaining the first and the second parts axially opposite one another in a torsion-proof manner in respective separate holding devices, of which at least one of the holding devices is arranged to be rotatable, heating the parts to a pasty state by frictional heating, rotating the parts relative to one another, pressing one of the parts into the other of the parts with a decreasing relative rotation and with increased axial force to effect friction welding, embossing, in the region of the holding face of the part in the holding device, regular positive-connection faces which match with corresponding positive-connection faces which match with corresponding positive-connection counterfaces in the holding device such that the first part is retained in the holding device in a positive torsion-proof manner, and thereafter stopping relative rotation of the parts.

The present invention also relates to a holding device in a friction-welding machine for the positive, torsion-proof holding of a first part for friction welding to a second part. The first part has, on a side facing the holding device, at least one at least approximately cylindrical face and an at least approximately axis-perpendicular face, along which the first part alignable in the holding device and retained in a tilt-proof manner and safe against falling out. The cylindrical face and the axis-perpendicular face of the first part merge into one another along a circularly extending workpiece edge. Positive-connection faces on the first part and matching negative positive-connection counterfaces on the holding device for the positive torsion-proof-retention of the first part in the holding device, at least in a region of the positive-connection faces, are made harder than the positive-connection faces of the first part.

In particular, the present invention is directed to a friction welding method and apparatus as is carried out or is in use in the industrial mass production of, for example, gear parts.

DE 3,802,300 C1 discloses the friction welding of a thin-walled tubular part to a solid part, but does not deal with the method of fixing the parts during friction welding. The problem addressed in that document is the high hardness of the tubular part and a frictional heating and sufficient softening of this same part.

Friction welding affords important advantages in relation to other welding methods, because it is highly efficient, makes no demands on the pretreatment of the faces to be joined, offers the possibility of welding through even large cross-sections over the entire area and works virtually free of distortion, so that finished parts can also consequently be joined without the need for reworking. Friction welding is therefore expedient for many instances of use with a rotationally symmetrical weld point, not only in mass production, but also in production with small batch sizes.

During friction welding, however, very considerable torques occur in the fixture of the workpieces to be welded together, above all towards the end of the welding operation. The parts therefore have to be held in the corresponding holding device with high torsion-proofing. Parts with regular positive-connection faces present in any case on account of their function afford some advantages in this respect because, by utilizing these positive-connection faces, such parts can be held in the appropriately adapted holding device positively, that is with very high torsion-proofing. The toothing of gearwheels, the blade ring of turbine wheels or pump impellers, the ring of holes of fastening flanges, spline profiling are examples of the many parts with such faces.

For a non-positive gripping in the clamping tool, parts which are rotationally symmetrical and smooth-faced on the outside must have high stability, that is large wall thicknesses, and also large engagement faces for correspondingly large and stable clamping jaws, so that the parts can be retained non-positively with sufficiently high torsion-proofing, because extremely high radial clamping forces have to be exerted on the workpiece for this purpose in view of the low coefficient of friction between metal parts.

These conditions are often absent at least on one of the parts to be welded together in the friction-welding method, either because the part is too thin-walled or it is too small in diameter on the circumferential face available for clamping or has too short an axial dimension. This occurs mostly in the case of essentially disc-shaped parts. So that the welding method favorable in production terms can nevertheless be employed in such instances, suitable positive-connection faces which, apart from the transmission of torque during friction welding, have no further function, have been worked, "artificially", as it were onto such workpieces on the circumferential face provided for holding the workpiece in the clamping tool. Examples of parts of this are, in addition to the essentially disc-shaped parts already mentioned, also pot-shaped parts of small diameter, e.g., screws, or thin-walled cylindrical, tubular or disk shaped parts. These parts offer no engagement faces for the vigorous application of clamping jaws.

An object of the present invention is to simplify substantially a method and holding device specifically to the effect that a positive connection required only for the transmission of torque during friction welding can be substantially simplified.

According to the present invention, this object has been achieved wherein the positive-connection faces located in the first part are produced only in the holding device by embossing carried out by the positive-connection counterfaces formed in the respective holding device and made cutter-like. The cutter-like positive-connection counterfaces are arranged at an acute angle ($\alpha$) of less than 45° to an axial force direction, as seen in an axial section, thereby digging into a peripheral workpiece edge of one part in a force-transmitting manner. The embossing step is carried out either directly before the friction welding by a separate axial pressing force which is applied separately or during the friction welding by utilizing the axial pressing force thereof. Because the positive-connection faces on the parts are produced automatically an operation akin to embossing during the friction welding, the outlay in terms of time and machinery for a separate production of positive-connection faces of this type is avoided. Also on account to the very small, but many, positive-connection faces in this region of the workpiece, the parts can also be kept smaller and lighter in comparison with larger positive-connection faces produced separately. The parts can therefore be produced more quickly and more cost-effectively and, furthermore, for reasons of weight, afford particular functional advantages.

Further advantages of the embodiment according to the invention of the holding device include a small constructional space of the holding device, thus also making friction welding possible in confined conditions of space, e.g., on the bottom of a pot-shaped part; a simple configuration of the workpiece-holding device without movable parts; nevertheless, a secure and positionally accurate clamping of the first part to be held; and also axially very short and thin-walled parts can be clamped reliably and therefore friction-welded, which has hitherto been impossible with a small constructional space.

BRIEF DESCRIPTION OF THE DRAWINGS

Other objects, advantages and novel features of the present invention will become apparent from the following detailed description of the invention when considered in conjunction with the accompanying drawings.

FIG. 8 is another embodiment of a workpiece holder for friction welding by the example of a stay bolt to be welded on.

DETAILED DESCRIPTIONS OF THE DRAWINGS

Figure 1:
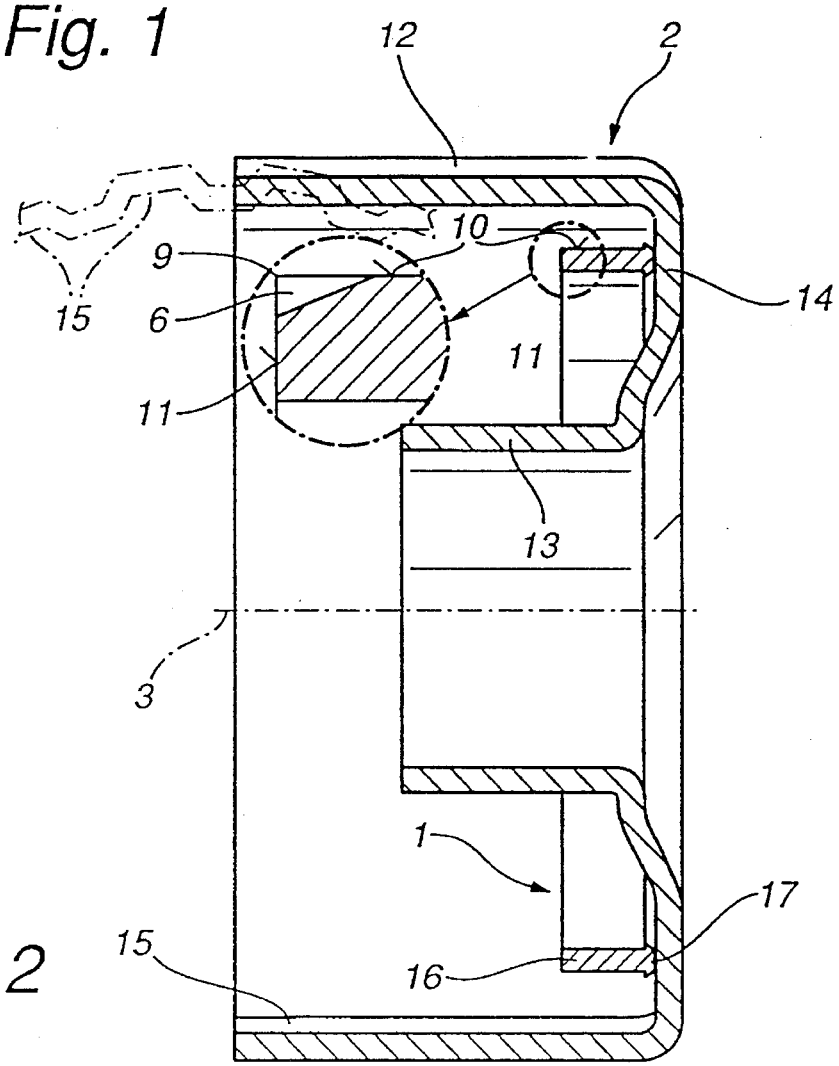
FIG. 1 is an axial sectional view through a pot-shaped brake-disc carrier for an automatic vehicle transmission, with a welded-on cylinder for a brake-actuating piston.
Figure 2:
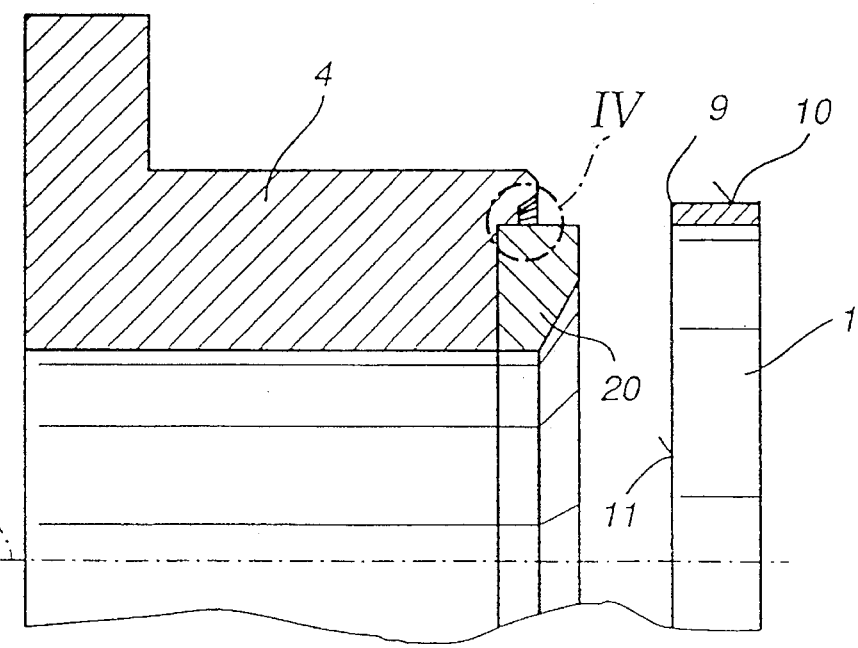
FIG. 2 is a partial cross-sectional view of the holding device for the thin-walled ring to be welded on and forming the cylinder as well as the ring to be inserted axially therein.

The workpiece illustrated in FIG. 1 is a brake-disc carrier for automatic transmissions. This workpiece is formed by assembling two different parts, namely an annular first part 1 and a pot-shaped second part 2. The pot-shaped outer part 2 has an outer casing 12, a bottom 14 and an inner tube 13 projecting centrically inwards. The outer casing is arranged in folds, in order to form dimensionally accurate axial grooves 15 for the reception of brake discs. A cylinder 16 must also be fastened sealingly and permanently to the bottom 14 of the brake disc carrier to subsequently guide and sealingly receives a plate-shaped actuating piston for the brake discs.

The cylinder 16 is formed by the annular first part 1 which is to be connected to the bottom 14 of the second part 2 by friction welding at the weld point 17. After the weld point 17 has been confined in terms of space both on the outside by the outer casing 12 and on the inside by the inner tube 13, it is very difficult, on one hand, to clamp securely the axially relatively short and, moreover, also relatively unstable first part 1 and, on the other hand, to bring first part 1 up against the bottom 14 within the second part 2, in order to join it there by a friction weld. A non-positive clamping of the part 1 is ruled out for reasons of space, because non-positively working holding devices of this type are very bulky and because of this cannot be brought up to the weld point 17 in any event.

A positive holding of the first part 1 in a corresponding holding device by employing conventional techniques is extremely expensive. It would be necessary to fashion with high dimensional accuracy on the rear side of the annular part 1 a crenelated ring of catches which would be required only for the purposes of friction welding and which would subsequently have to be lathe-turned off in a separate operation. Specifically, a high machining accuracy is required, so that, after only very slight deformations on the individual positive-connection faces, a torque transmission can be built up as uniformly as possible on all the positive-connection faces and the part does not experience uncontrolled deformation over the circumference, for example as a result of a widely varying load. The formation of positive-connection faces of this type is not only a very expensive operation, but correspondingly more material has to be provided for these positive-connection faces. This makes the production of the ring and of the entire brake-disc carrier more expensive.

Figure 3:
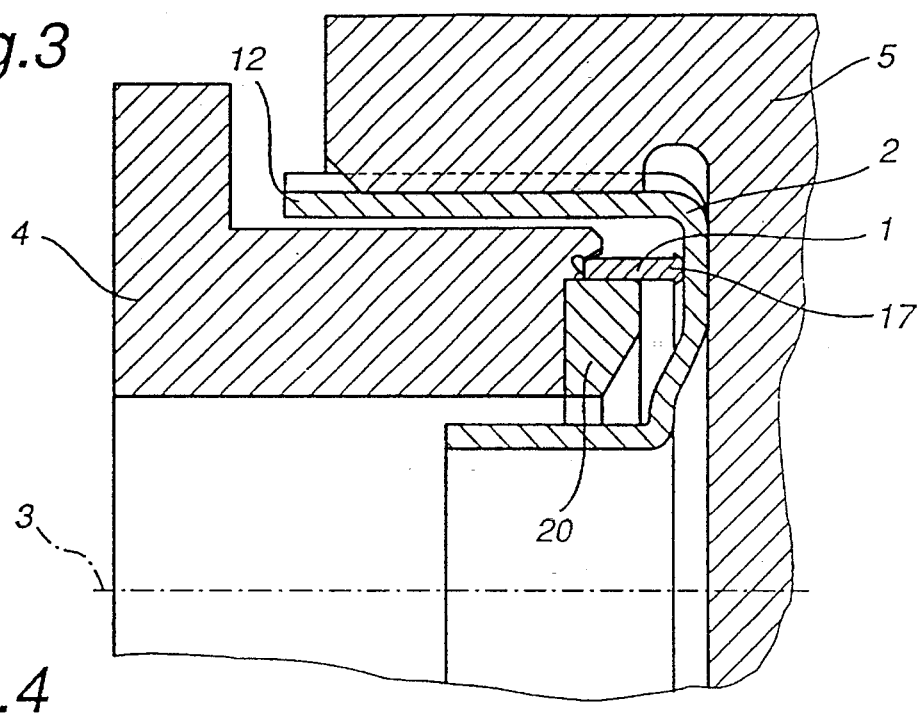
FIG. 3 is a cross-sectional view of the three-dimensional interaction of the two parts holders during friction welding.
Figure 4:
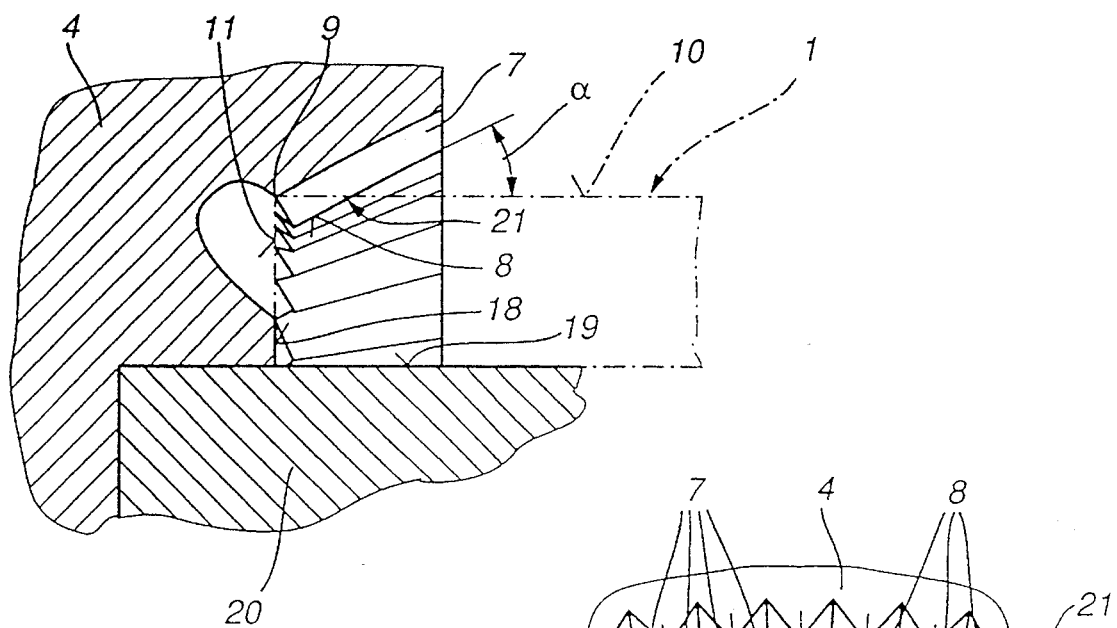
FIG. 4 shows an enlarged view of the detail IV from FIG. 2.
Figure 5:
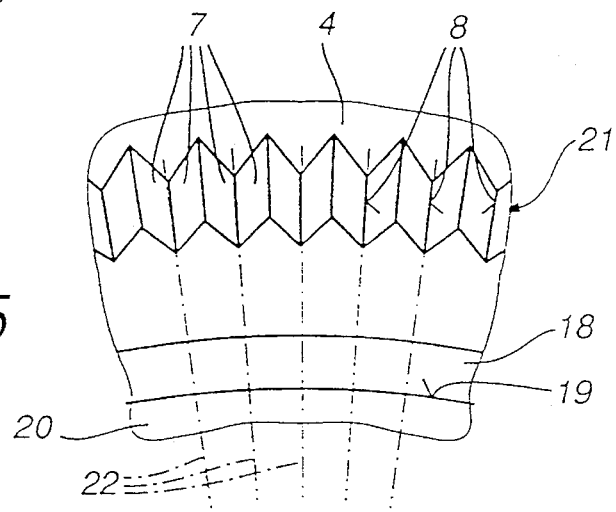
FIG. 5 is an axial view of the detail view of FIG. 4.

In order to avoid these disadvantages, the present invention provides, a positive holding of the first part 1 in the associated holding device 4 of the friction-welding machine as seen in FIG. 3, but the positive-connection faces 6 located on the parts are produced only during the execution of the friction welding by utilizing the axial pressing force by way of an embossing operation carried out by the positive-connection counterfaces 7 which are formed in the holding device 4 and which, for this purpose, are made sharp-edged and cutter-like as seen in FIGS. 4 and 5. The cutting lines 8 of the positive-connection counterfaces 7 are arranged inclined at an acute angle α of less than 45°, preferably of approximately 30°, to the axial force direction as seen in FIG. 4. As a result, the cutter-like positive-connection counterfaces 7 can dig in a manner similar to embossing into a peripheral workpiece edge 9 of the first part 1 (see in particular the enlarged portion in FIG. 1) in a force-transmitting manner and thus form the positive-connection faces 6 located on the parts.

The peripheral edge 9, which is arranged in a region of the first part 1 which faces the holding device 4, is formed by a cylindrical workpiece surface 10 and by an axis perpendicular face 11. The positive-connection counter-faces 7 of the holding device 4 are also provided in this region. As above noted, these counterfaces 7 are made cutter-like with a cutting line 8 and are arranged in close succession in a ring form and correspond in their position to the peripheral workpiece edge 9 of the part 1 to be held. The cutting lines 8 lie on the envelope of a cone which has an imaginary apex pointing in the direction of insertion of the part 1 into the holding device 4. The cutting lines 8 each lie at least approximately in a radial plane 22 shown in the dot-dash lines in FIG. 5.

The positive-connection counterfaces 7 located on the device can be produced, for example, by providing a narrow inner conical face or inner phase on the holding device, in the non-hardened state, with a knurling 21 on a lathe by the use of a narrow knurling roller. The part machined in this way is subsequently hardened. The positive-connection counterfaces 7 can, of course, also be produced by milling or grinding with fine tools. The depth of insertion of the part 1 into the holding device 4 and guidance in terms of a good plane position are determined by an annular axis-perpendicular bearing face 18 which directly adjoins the knurling 21 in the axial direction. A cylindrical guide face 19 is provided radially within the knurling 21 to guide and stabilize the annular part 1 radially, and to maintain an exact circular shape. So that the region of the knurling 21 can be reached easily at the stage of production of the holding device 4, the guide face 19 is formed on a separate guide ring 20 which is connected releasably to the holding device 4.

By pushing the annular part 1 onto the guide ring 19 and by exerting uniform axial pressure on the part 1, the latter is pressed with its rear end face into the knurling 21, so that a very fine-toothed positive connection is made between, on one hand, the holding device 4 and, on the other hand, the part 1. This axial pressure can be exerted by the axial pressure during friction welding. Since the inclination of the cutting lines 8 is relatively low (angle α), the relative force effect with which the cutters penetrate radially into the workpiece is greater than the axial force. It is merely necessary to ensure that the part to be held cannot shift radially away from the knurling. In the embodiment illustrated in FIGS. 1 to 5, this is ensured by the guide face 19 already mentioned.

Because the holding device is configured according to the present invention and because the positive connection between the holding device and workpiece is made according to the invention, the holding device 4 can be sized very small, so that, in the confined conditions of the workpiece according to FIG. 1, the weld point 17 can be reached directly. Nevertheless, as experience has shown, the part 1 is held in the holding device 4 with very high torsion-proofing, so that any concerns that the part 1 may slip in the holding device 4, which at first appeared justified, have proved to be unfounded.

The pot-shaped second part 2 is held in the associated holding device 5 positively as seen in FIG. 3, and therefore in a torsion-proof manner via the corrugated outer casing 12. In welding tests close to production conditions, the pot-shaped part 2 and the associated holding device 5 were held fixedly, whereas the annular first part 1 and the associated holding device 4 rotated about the axis of rotation 3. The holding devices contain no movable parts; on the contrary, the parts 1 and 2 are retained in the associated holding devices by a slight sliding fit in a manner safe against falling out. The friction welding operation itself may be assumed here to be known, and to that extent therefore explanations are unnecessary.

Figure 6:
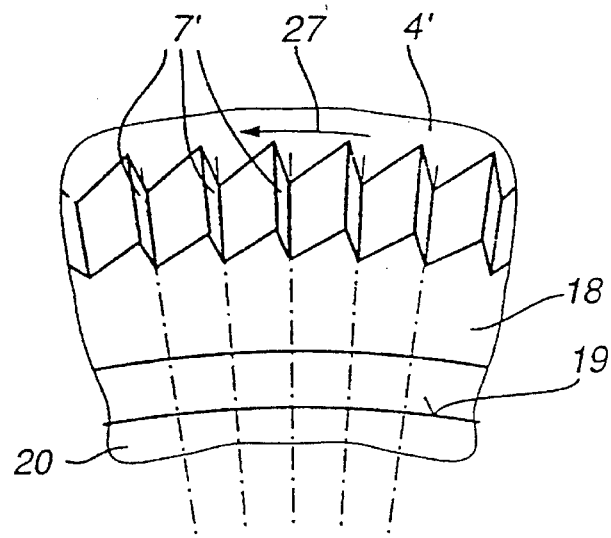
FIG. 6 is a modification of the toothing shown in FIG. 5.

The knurling shown in FIGS. 4 and 5 is made symmetrical with regard to the flanks located on both sides of a respective cutting line 8. In the embodiment of FIG. 6, individual teeth of the knurling are made asymmetric in the manner of sawteeth, such that the steeper flank of the teeth point forwards in the direction of rotation 27. Such a knurling ensures that an even higher torque can be transmitted reliably than with a knurling according to FIG. 5.

Figure 7:
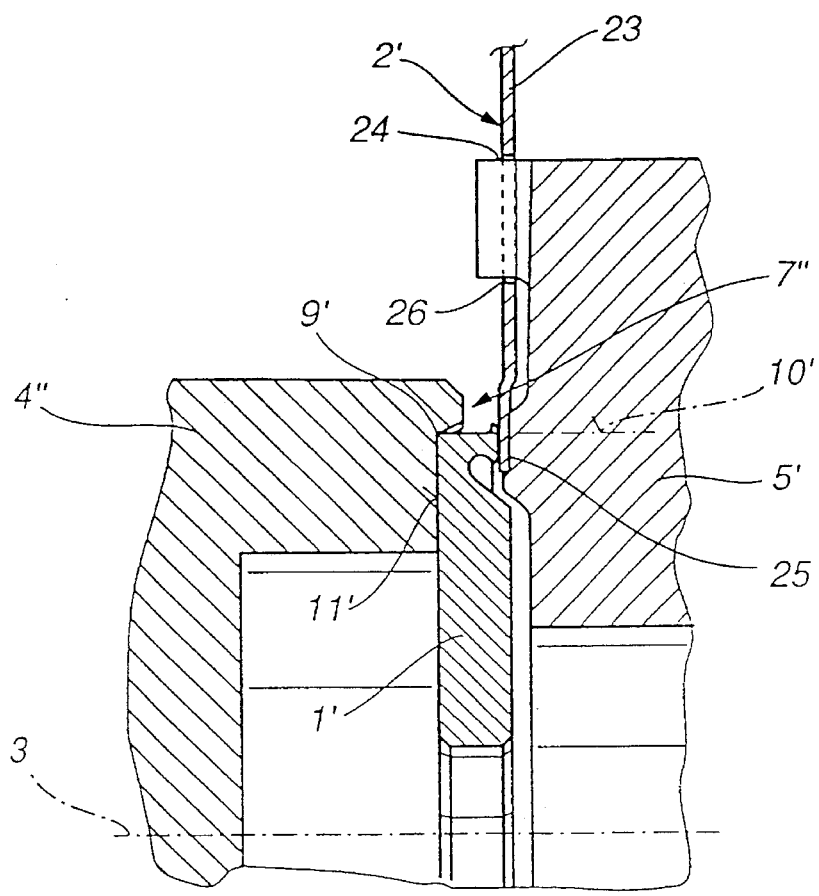
FIG. 7 is a partial sectional view of a workpiece holder according to the present invention during the friction welding of a disc-shaped hub onto a wheel body consisting of sheet metal.

FIG. 7 shows another application of the positive workpiece holding according to the present invention. There, the first part 1' is made essentially disc-shaped. However, it also has a peripheral edge 9' which is formed by a cylindrical face 10' and an axis-perpendicular face 11'. The first part 1' constitutes the hub of a rotating wheel. The second part 2' is formed from sheet metal and constitutes the wheel part of the wheel, in which a flange 26 projects radially inwards in an axis-perpendicular plane on the inner edge of the wheel. The flange 26 is to be connected by friction welding to an axially projecting collar on the outer edge of the essentially disc-shaped hub 1'. The holding device 4" for the first part 1' is constructed in a similar way to the holding device 4 according to FIGS. 2 or 3.

In view of the fact that the disc-shaped part 1' in FIG. 7 is very rigid in the radial direction, a corresponding guide can be dispensed with. The holding device 4" also carries on a conical inner face a knurling which forms positive-connection counterfaces 7". The peripheral edge 9' of the part 1' is pressed axially into these positive connection counterfaces 7". A captive retention of the first part 1' in the holding device 4" can be ensured by conventional magnetic clamps or vacuum-loadable faces (not shown). With this retention, it is preferable if the axial pressure with which the embossing operation which produces the positive-connection faces on the parts is exerted before the commencement of the friction welding. This ensures that the disc shaped first part 1' is retained in the holding device 4" in a wobble-free and captive manner.

The second part 2', namely the wheel body, is centered radially on a small shoulder on the holding device 5'. A positive rotational take-up is ensured in the circumferential direction by catches 24 which engage into recesses 26, for example, present on the wheel body and arranged in a regularly distributed manner. An axial fixing of the second part on the holding device 5' (not shown) can be effected with various known possibilities such as, for example, magnetic, a vacuum or mechanical gripping in the blade region.

In FIG. 7, which has likewise been tested close to mass-production conditions, the wheel body 23 and the associated holding device 5' are held fixedly during the friction welding, whereas the disc-shaped hub, the part 1' and the corresponding holding device 4" are rotated about the axis of rotation 3 and were pressed down axially. Also in this embodiment, it was seen that there was a completely reliable torque connection between the part 1' and holding device 4" which give no cause for any fears as to slip or the like. The knurling left behind in the region of the peripheral workpiece edge 9 or 9' and forming the positive connection faces 6 located on the parts does not usually cause any obstruction, an least not in the two instances of use described hitherto. Should such a knurling nevertheless cause obstruction, a small excess length of material, which could subsequently be stripped, would have to be kept in reserve.

Figure 8:
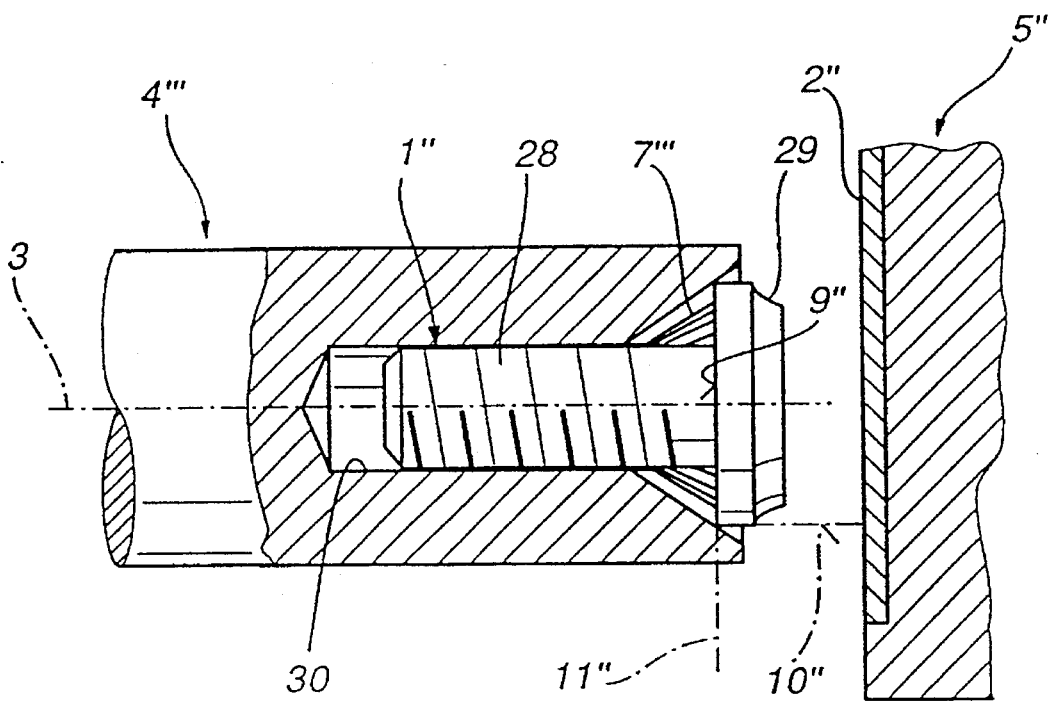

Another embodiment is shown in FIG. 8 in which there are a workpiece retention with a holding device 4'" for a threaded stay bolt as a first part 1" and a holding device 5" for a thick-walled second part 2", via which the threaded stay bolt is to be fastened to the sheet-metal part 2" by friction welding. Such stay bolts to be fastened to a larger component by welding conventionally carry, at the welding-on end of the shank 28, a head 29 having a diameter which is clearly larger than the shank diameter, in order to acquire a larger base in the fastening region subjected to maximum stress. Electrical resistance and arc welds for the welding on of stay bolts of this type are known and in widespread use. It has not been possible for friction welding to gain wide acceptance for this use, because the torque absorption at least of threaded stay bolts presents problems. In particular, the thread-carrying shank 28 should not be gripped tautly in a chuck, because the thread flights would be damaged thereby.

Also in the case of stay bolts the present invention affords a solution to the easy, but positive and torque-bearing holding of the threaded stay bolt in the holding device 4'". In the illustrates embodiment, a bore 30 is provided concentric to the axis of rotation 3 and is intended for the low-play holding of the shank 28. The threaded stay bolt can be held aligned centrically and axially in the bore 30. The conventional head 29 of the bolt has a peripheral workpiece edge 9" which is formed by the overlap of an at least approximately axis-perpendicular face 11" and a likewise at least approximately cylindrical face 10".

For the purpose of the present invention, it is preferable to use bolts in which, in the region of the head facing the shank, the peripheral workpiece edge is not widely rounded or chamfered. The holding device 4''' is set against this workpiece edge by a conical knurling which contains fine, sharp-edged, conically arranged positive connection counterfaces 7''' made of hard material which, when the bolt is pressed axially into the holding device 4''', dig permanently into the workpiece edge 9''' and thereby ensure a positive rotational take-up between the holding device 4''' and stay bolt (part 1"). Should the stay bolt to be welded on consist of a high-strength material (in the case of friction welds. at least one partner is often made of a high-strength material), it is advantageous, after the stay bolt has been inserted into the holding device 4''', to ensure a sufficiently deep embossing of the positive-connection counterfaces 7''' located on the device into the peripheral workpiece edge 9" by way of an approximately axially guided knock on the head 29 of the bolt. In particular, as regards the welding diameters which are relatively small here and the correspondingly high friction rotational speeds, the axial forces exerted at the same time are comparatively low and, at least in the case of high-strength bolt materials, could, under some circumstances, be insufficient by that means alone to cause the positive-connection counterfaces 7''' to penetrate sufficiently deep into the workpiece edge 9". By virtue of the bore 30 and of the shank 28 guided therein in a tilt-proof manner, even a knock on the bolt head striking it eccentrically and/or guided at a slight inclination would nevertheless lead to a circumferentially identical embossing of the positive connection counterfaces 7''' into the workpiece edge 9".

Figure 9:
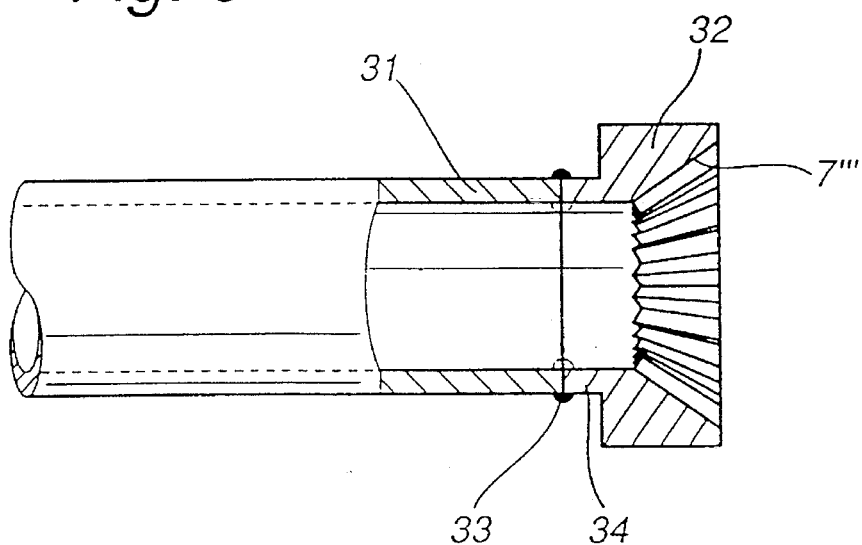
FIG. 9 is a low-mass modification of the holding device of FIG. 8 for a welded stay bolt.

It may also be mentioned, for the sake of completeness, that the holding device for the stay bolt can also be formed by assembling, especially by welding together a plurality of parts. For example, FIG. 9 shows a tube 31 made of structural steel and having an inside diameter corresponding to the diameter of the bolt shank 28. The tube 31 is welded to an annular crown 32 carrying the positive connection counterfaces 7''' and made from a high strength and hard material. The welding is preferably also carried out by the friction-welding method. However, the inner of the two friction-welding burrs 33 which are simultaneously formed have to be removed by internal stripping or the like. To be beneficial to a good friction-welded joint between the tubes 31 and crowns 32, a short extension 34 corresponding to the tube cross-section is fashioned on the end face of the crown facing the tube, so that, during friction, even the stronger material softens sufficiently. In comparison with the holding device of FIG. 8, the embodiment of FIG. 9 also has, in addition to simple production and therefore low production costs, the further advantages has a lower mass moment of inertia, is suitable for all possible bolt lengths, and that it can be clamped in conventional low mass collet chucks. A low mass moment of inertia is important, above all, for a rapid braking of the rotating friction partners at the end of the friction-welding operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for friction welding of a first part, having a functional smooth-faced outside portion to a second part, comprising the steps of holding the first and the second parts axially opposite one another in respective separate holding devices, of which at least one of the holding device is rotatably arranged; heating the first and second parts to a pasty state by friction; retaining the first and second parts in a torsion-proof manner by embossing, in the region of a holding face of the first part in the respective holding device, regular positive-connection faces which match with corresponding cutter-like, positive-connection counterfaces in the holding device arranged at an acute angle ($\alpha$) of less than 45° to an axial force direction, as seen in an axial section, digging into a peripheral workpiece edge of one part in a force-transmitting manner; rotating the parts relative to one another; pressing one of the parts into the other of the parts with a decreasing relative rotation and with increased axial force to effect friction welding; and thereafter stopping relative rotation of the parts, wherein the embossing is carried out one of directly before the friction welding by a separate axial pressing force which is applied separately and during the friction welding by utilizing the axial pressing force thereof.

2. The method according to claim 1, wherein the peripheral workpiece edge facing the holding device in a region where the positive-connection faces are to be formed during the friction welding, is formed by an at least approximately cylindrical face and an at least approximately axis perpendicular face.

3. In a holding device for a friction-welding machine for positive, torsion-proof holding of a first part for friction welding thereof to a second part, which first part has, on a side facing the holding device, at least one approximately cylindrical face and an at least approximately axis perpendicular face, along which the first part is alignable in the holding device and retained in a tilt proof manner and safe against falling out, the cylindrical face and the axis-perpendicular face of the first part merging into one another face along a circularly extending workpiece edge, with positive positive-connection faces on the first part and matching negative positive-connection counterfaces on the holding device for the positive torsion-proof retention of the first part in the holding device, the holding device, at least in a region of its positive-connection faces, being made harder than the positive-connection faces of the first part, the positive-connection counterfaces being made cutter-like, and with cutting lines on an envelope surface of a cone and, as seen in an axial section arranged at an acute angle ($\alpha$) of less than 45 degrees to the axial force direction, arranged in a ring-line form in close succession in the region of the position of the circularly extending workpiece edge of the part held in the holding device, such that, by utilizing mutual axial pressing force during the execution of the friction welding, the positive-connection counterfaces are embossed into material of the first part in the region of the peripheral workpiece edge as a result of the acute-angled inclination ($\alpha$) in a force-transmitting manner, and the positive-connection faces are capable of being produced automatically via the holding device.

4. The holding device according to claim 3, wherein each of the cutting lines of the positive-connection counterfaces is arranged at least approximately in a respective radial plane, as seen in an axis-perpendicular section.

5. The holding device according to claim 3, wherein the cutting lines are arranged at an acute angle ($\alpha$) of about 10° to 35°, to an axial force direction, as seen in axial section.

* * * * *